Dec. 6, 1960 W. C. McCORMICK 2,962,979
METHOD OF CORRECTING EXISTING TRACK AND ALIGNMENTS
AND MEANS FOR PRACTICING IT
Filed May 21, 1959 12 Sheets-Sheet 1
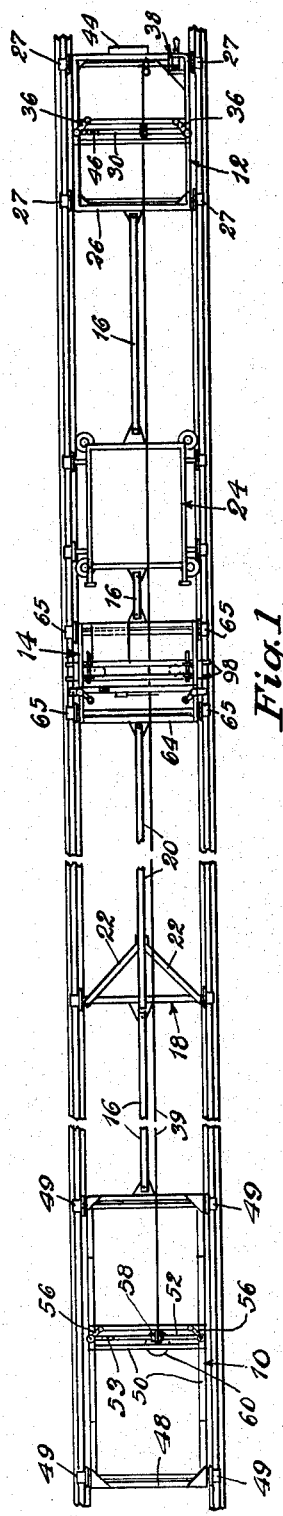
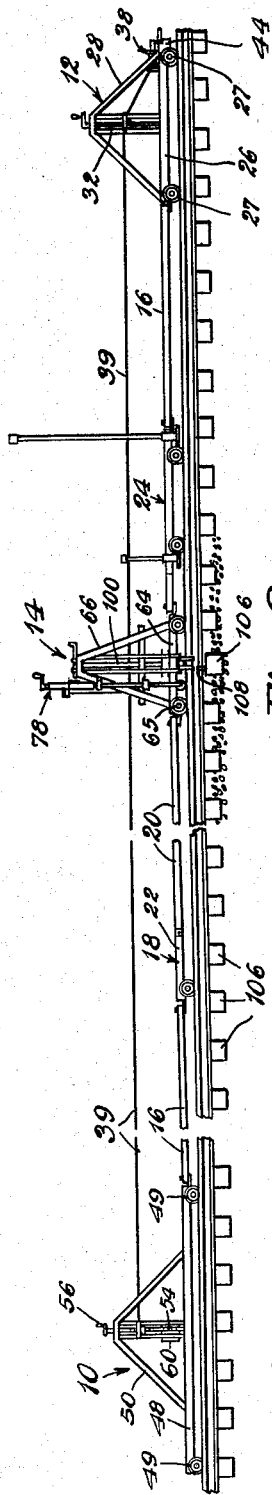
Inventor
William C. McCormick
by Parker & Carter
Attorneys

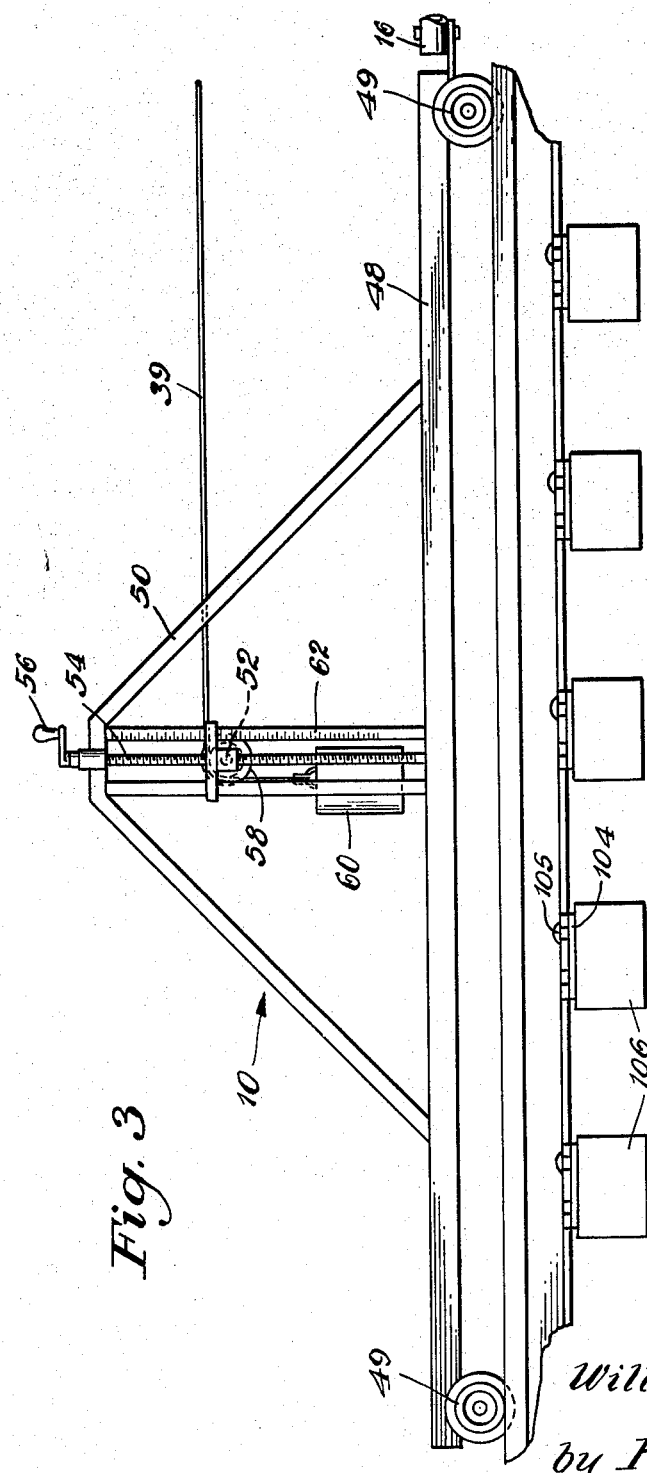

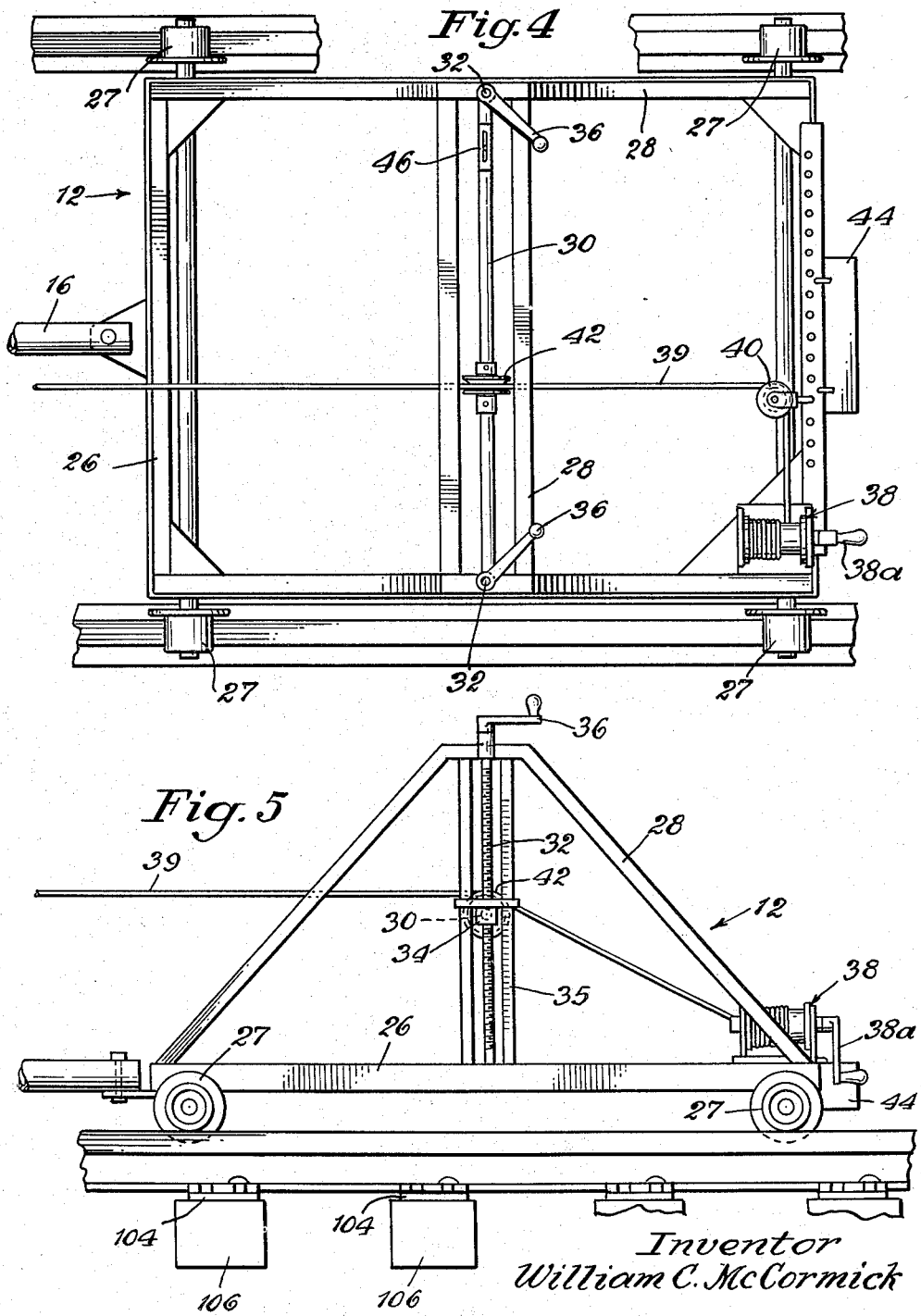

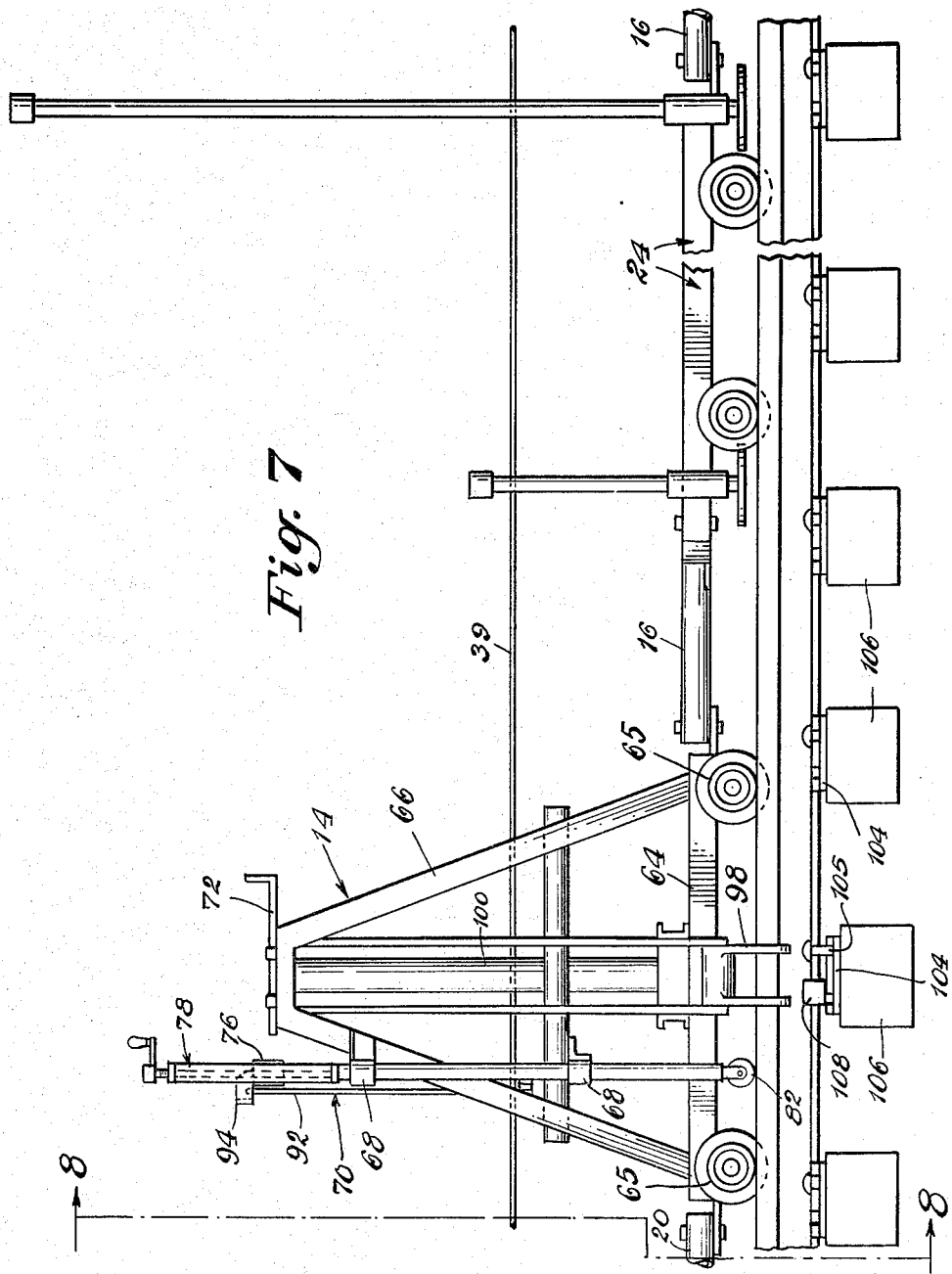

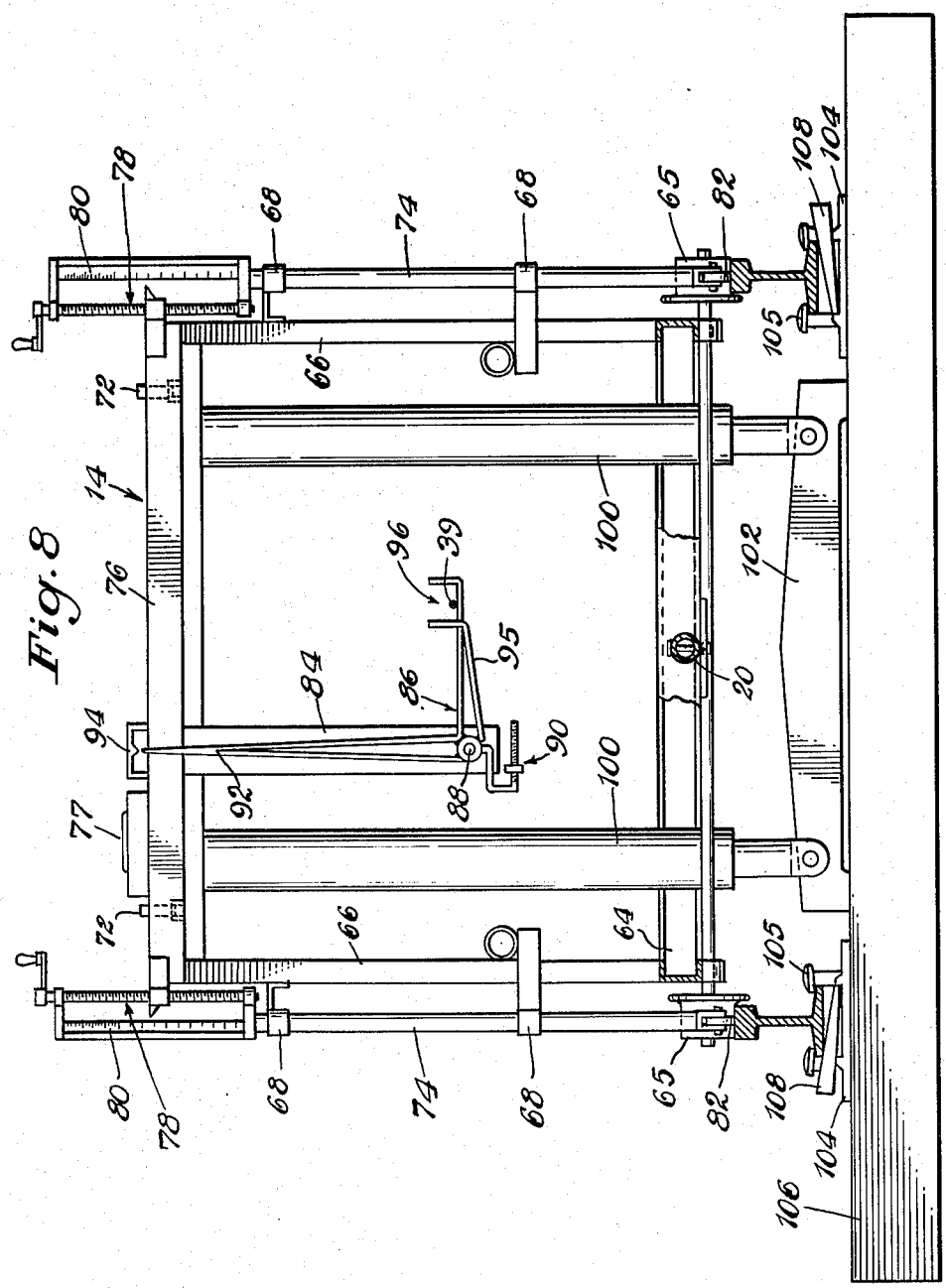

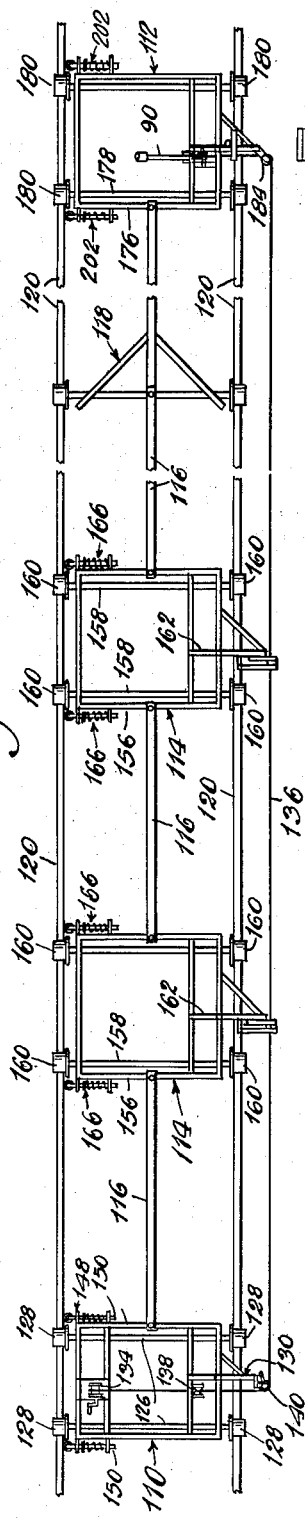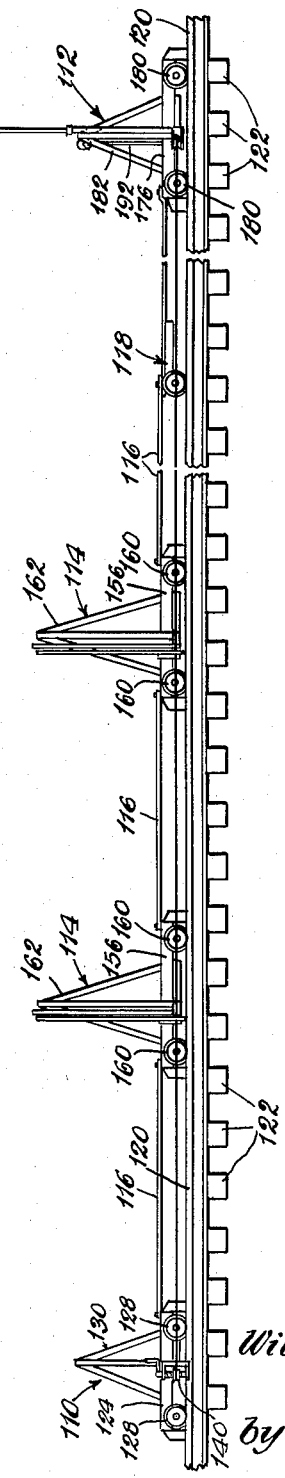

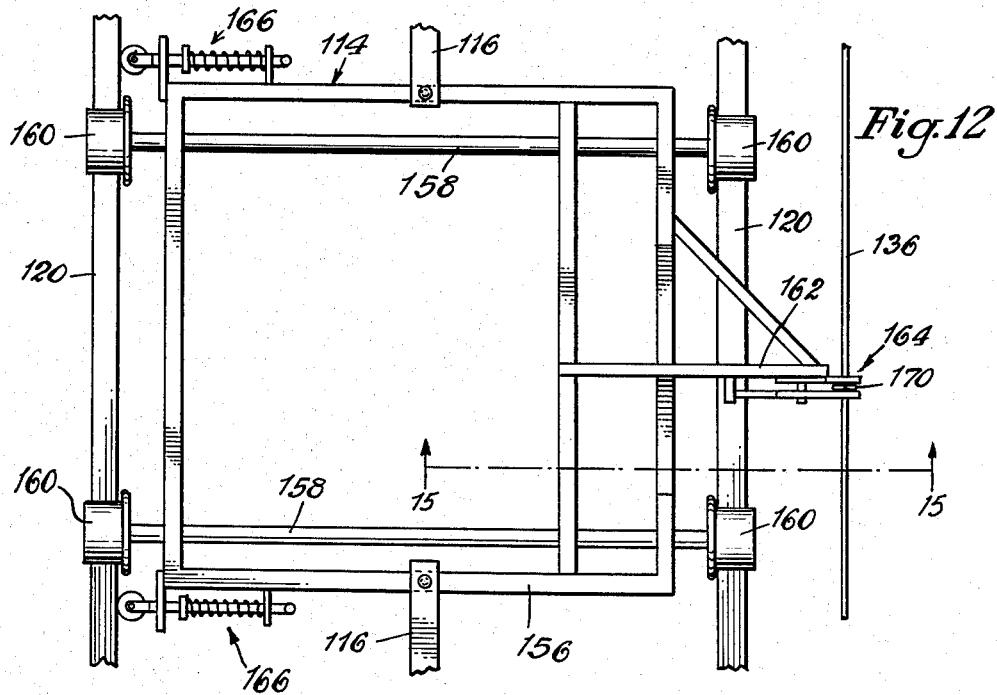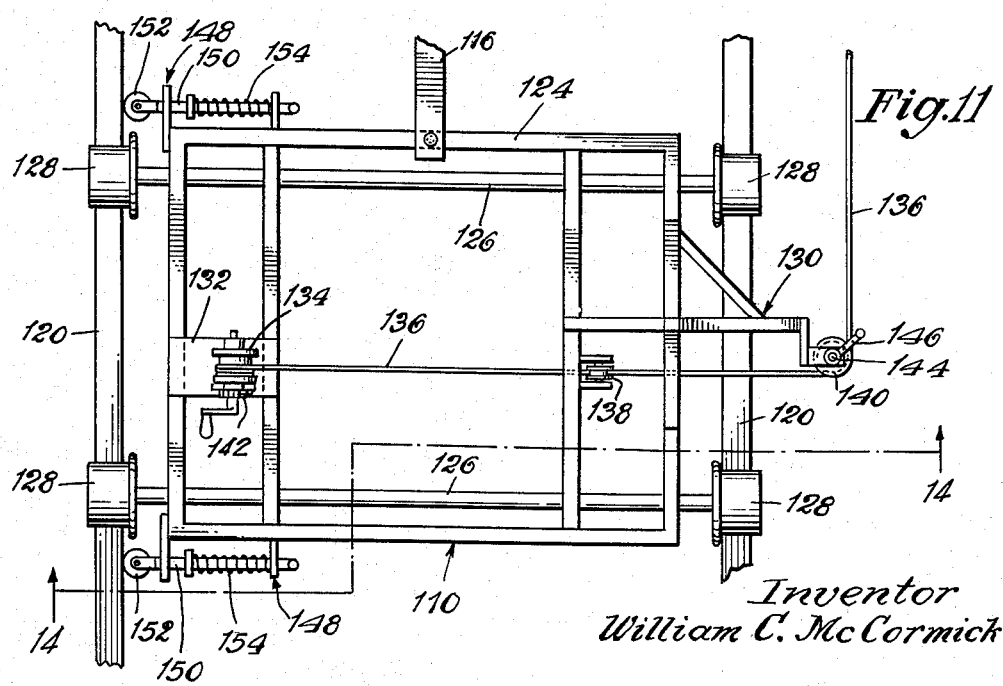

Inventor
William C. McCormick
by Parker & Carter
Attorneys

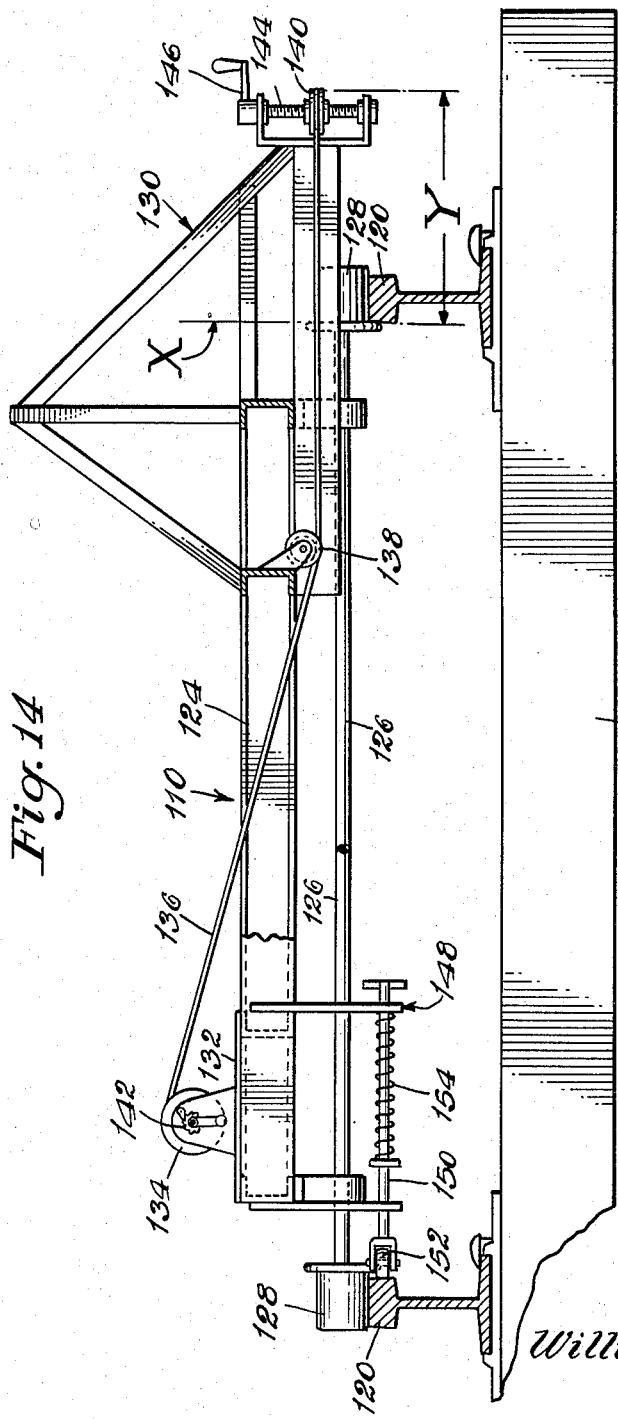

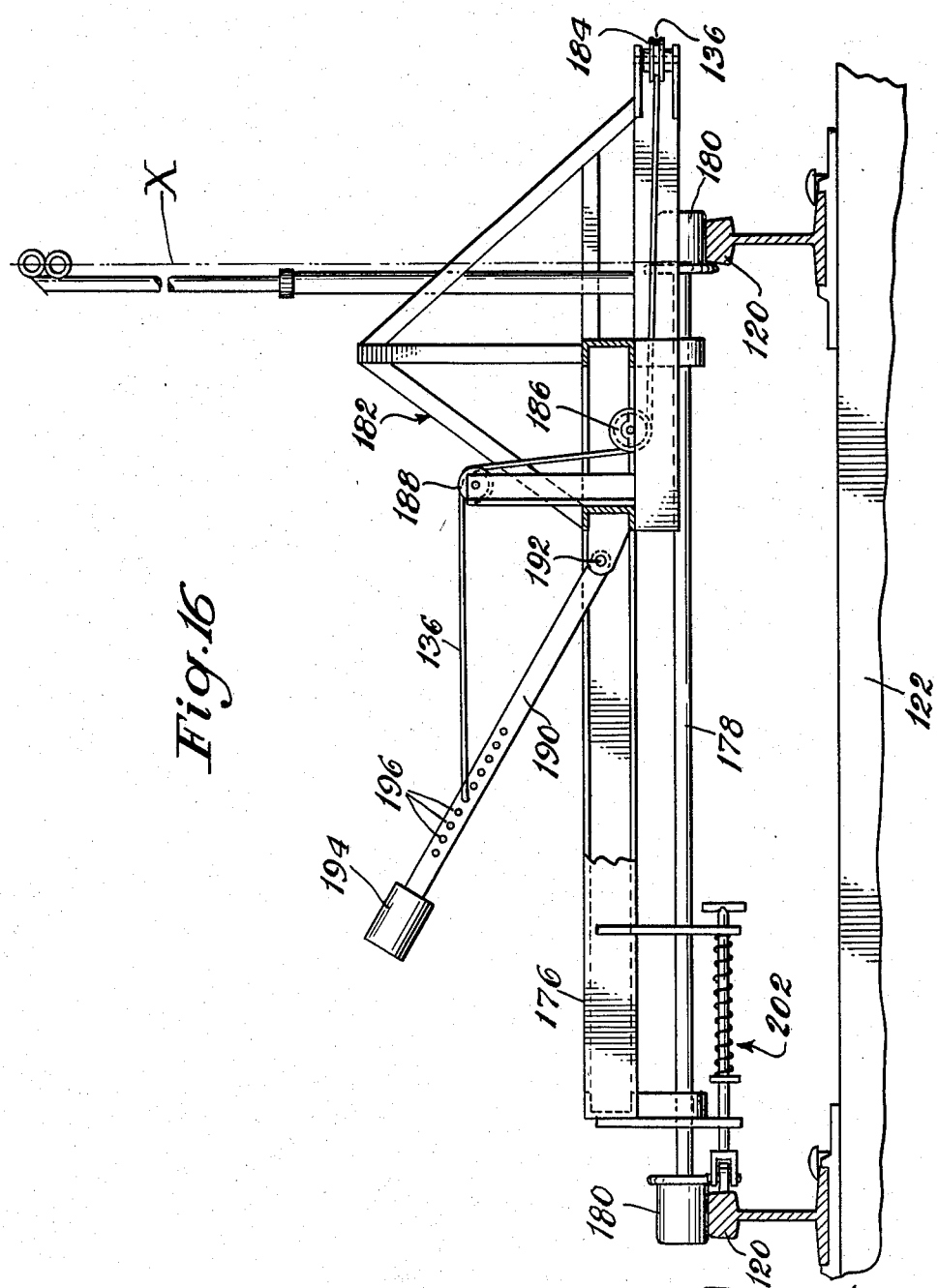

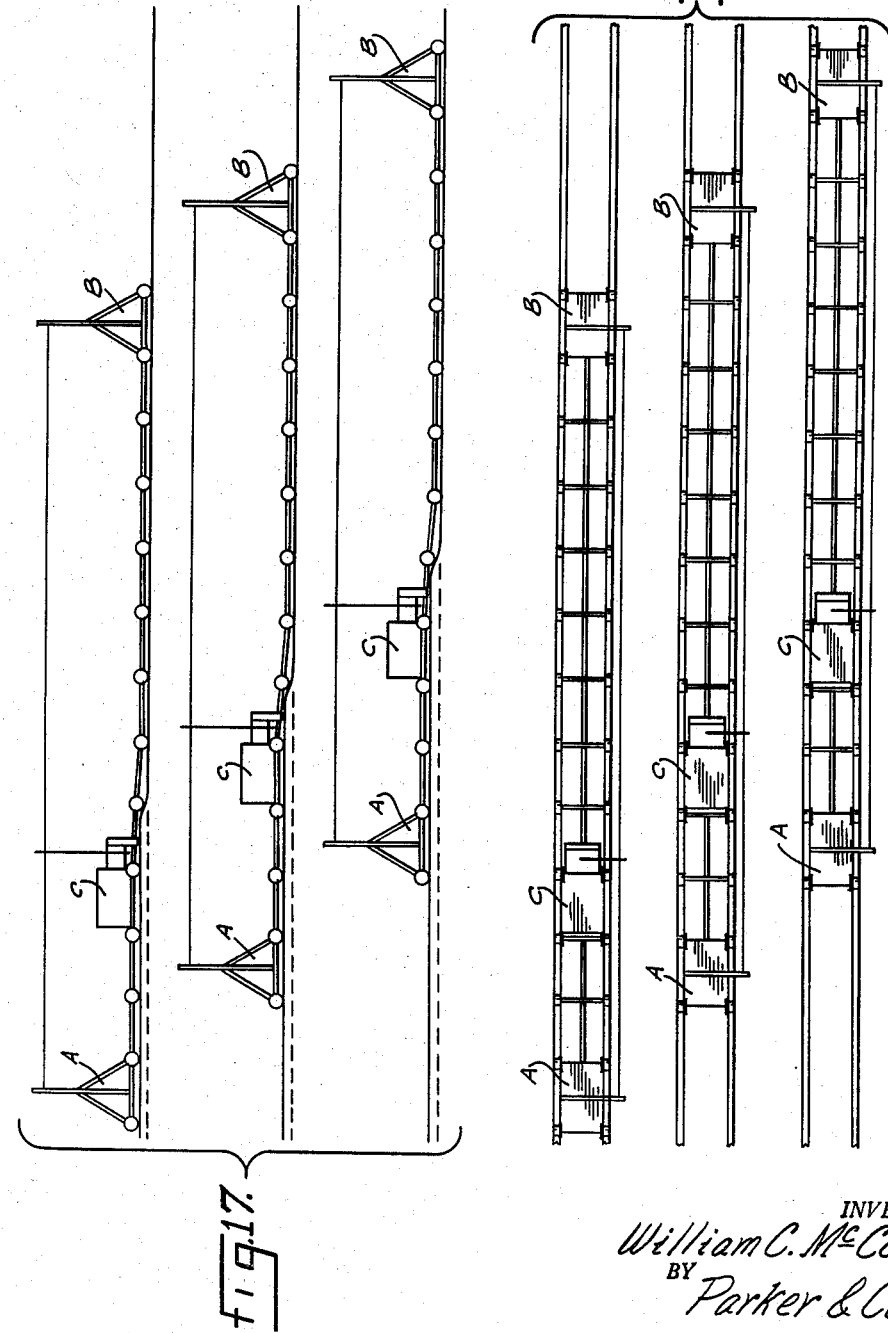

United States Patent Office 2,962,979
Patented Dec. 6, 1960

2,962,979

METHOD OF CORRECTING EXISTING TRACK AND ALIGNMENTS AND MEANS FOR PRACTICING IT

William C. McCormick, Jacksonville, Fla.

Filed May 21, 1959, Ser. No. 818,242

9 Claims. (Cl. 104—7)

This invention is in the field of railroad track profile or surface control and applies particularly to situations where an existing profile or surface is to be improved or adjusted.

Another purpose is to provide a method of aligning railroad, track, and the like.

Another purpose is to provide an improved method for raising existing track to improve its profile and surface.

Another purpose is to provide a method for improving the alignment of existing track.

Another purpose is to provide mechanisms adaptable to the carrying out of any of the above mentioned methods.

Another purpose is to provide method and means for adjusting profiles, tracks, and the like in which a datum line or plane is maintained and in which the only measurement necessary is the observation of the relation of the work to the datum line or plane.

Another purpose is to provide a method which is free from the necessity of the use of instruments or accessories such as spot boards, surveyors' instruments, and other devices for linear observation by sight and which is free from the necessity of measurement and computation prior to work.

Another purpose is to provide an improved method for adjusting tracks, whether as to profile or as to alignment.

The present application includes material from, and is a continuation-in-part of my two prior filed applications No. 602,663, for Railroad Track Surfacing Instrument, filed in the United States Patent Office on August 7, 1956, now abandoned, and No. 645,788, for Track Aligning Instrument, filed in the United States Patent Office on March 13, 1957, now abandoned.

I illustrate the invention more or less diagrammatically in the following drawings wherein:

Figure 1 is a plan view of a track resurfacing assembly;

Figure 2 is a side view of Figure 1;

Figure 3 is a side view of the front or lead car or station on an enlarged scale;

Figure 4 is a plan view on an enlarged scale of the rear car or station;

Figure 5 is a side view of the structure of Figure 4;

Figure 7 is a side view of the structure of Figure 6;

Figure 8 is a section along the line 8—8 of Figure 7;

Figure 9 is a plan view of a track line indicator or aligning instrument for applying my method to track alignment;

Figure 10 is a side view of the structure of Figure 9;

Figure 11 is a plan view of the rear car or station of Figure 9;

Figure 12 is a plan view of an intermediate car or station;

Figure 14 is a section on line 14—14 of Figure 11;

Figure 16 is a section on the line 16—16 of Figure 13;

Figure 17 is a diagrammatic illustration of my method as applied to track surfacing; and Figure 18 is a diagrammatic view of my method as applied to track aligning.

Like parts are indicated by like symbols throughout the specification and drawings.

Figure 6:
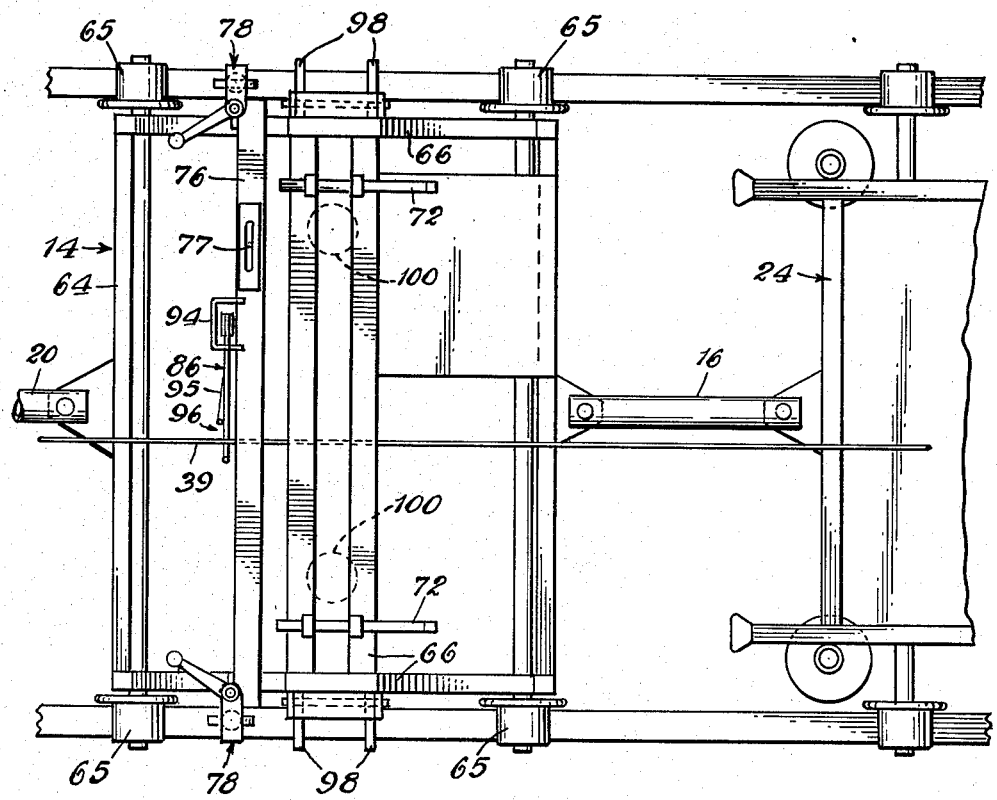
Figure 6 is a plan view of an intermediate car or station.
Figure 15:
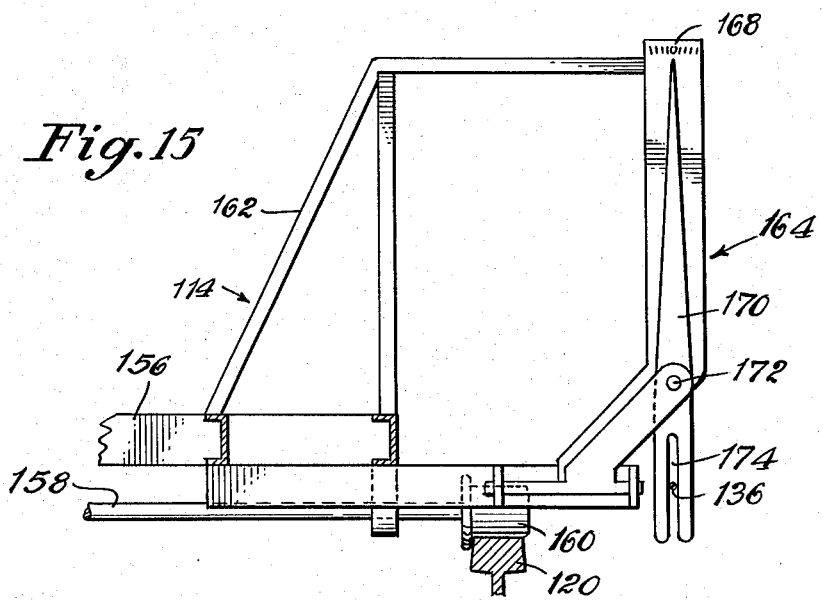
Figure 15 is a section on the line 15—15 of Figure 12.
Figure 13:
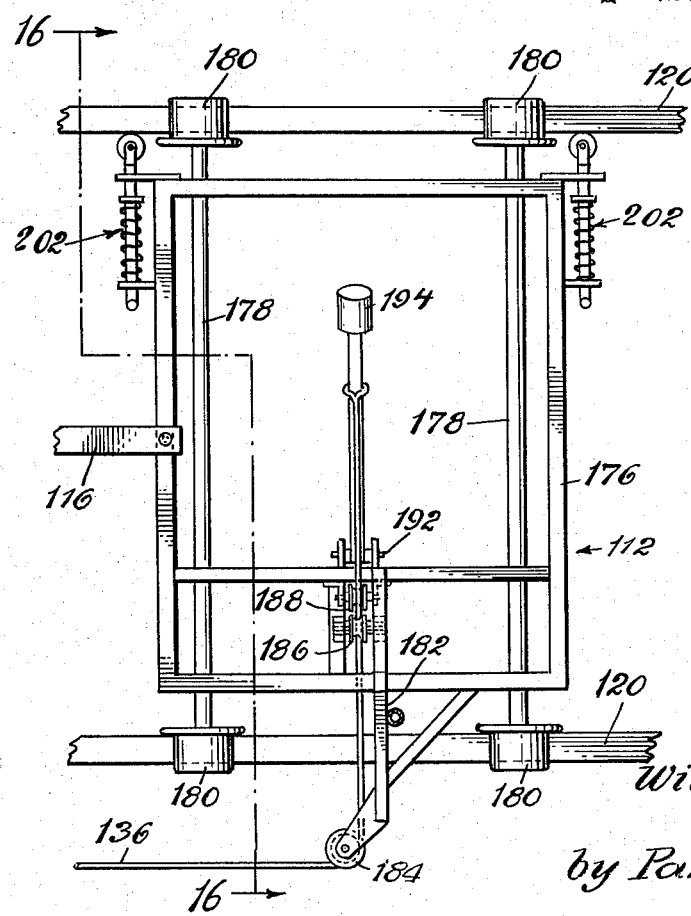
Figure 13 is a plan view of the forward car or station.

Since my method is applicable, for example, both to adjustment or surfacing of existing track and to correcting or changing the alignment of existing structures I have illustrated herein a mechanism both for surfacing and for alignment.

I may summarize my method as including providing and maintaining a datum line over or along a rail to be aligned. I find it convenient to use as a datum line a wire tensioned between a forward and a rear station, the two stations being normally separated by a uniform distance and being moved in unison, from time to time, in a series of steps, as work progresses. While I find it practical to use a tension wire it will be understood that my method may be carried out by other means for establishing a datum line. A ray of light may be employed or a radar beam or any other suitable means for establishing and maintaining the datum. While I speak in terms of a datum line, the line may be considered as defining or lying in a datum plane. In varying or altering the railroad track or right of way, the datum plane may be though of as generally horizontal and as extending over the surface to be altered. However, in practice, a single wire or line gives an adequate datum toward which to work.

In considering the practice of my invention assume that a datum line has been established between two stations. As a specific example, consider a wire of the order of 120' to 125' tensioned between a forward and a rear carriage or station. In surfacing practice this wire may be supported at the rear station a predetermined distance above the supporting surface. Similarly, at the forward station it may also be supported a predetermined or controlled distance above the surface of support. The datum line may be at the same height at both stations, or it may be somewhat higher or even somewhat lower at the forward station than at the rear station. In railroad practice it is generally somewhat higher at the forward station than at the rear station. Between the two stations I use at least one intermediate station or carriage which includes sensing means for easily observing changes in the level or profile being altered. In a typical operation these sensing means may be associated with or included with work performing means. The users or workmen merely perform work at the intermediate station until the sensing means tells them that the work has brought the profile or surface to the desired relation to the datum line or plane. The entire assemblage of stations is then moved forward by a step not greater than the distance between the rear station or carriage and the intermediate station or carriage.

For purposes which will later be described in detail, I find it important to have the intermediate carriage nearer the rear carriage that the front carriage. All carriages are moved in unison, step by step, and work is done, at the intermediate carriage or station, between steps, at a point or zone nearer the rear carriage than the front carriage. The rear carriage, when work is being done, always rests on finished surface or profile or finished alignment, if aligning is being done, and the intermediate station is always so spaced from the rear station that the work done at the intermediate station will not disturb the surface or the alignment at the rear station.

With this background, I will consider in detail, first, my invention as applied to railroad track surfacing.

In Figures 1 and 2, a front or lead car is indicated at 10, a rear car at 12, and an intermediate car carrying an indicator at 14, separated by spacing cars or spacers which may take the form of bars 16 connected between adjacent cars, a wheel assembly 18 carrying a bar 20 with suitable braces 22, and possibly a set-off or push car 24 for carrying tools, etc., which is unimportant in detail.

In track surfacing the reference wire or line is related always to the grade rail, whether on curves or on tangent track. The only difference between surfacing on curves and on tangent or straight track is that on curves the opposite rail is raised to super level, whereas on tangent track both rails are kept at the same level.

Considering the cars in detail, the rear car in Figures 4 and 5 has a suitable base 26, rectangular or otherwise, mounted on wheels 27 with a frame 28 above it to support a transverse shaft 30 which is adjustably carried on each side by threaded adjusting rods 32 passing through threaded blocks 34 supporting the ends of the shaft 30. The frame has a suitable scale 35 for reasons set forth later. Each adjusting rod has a handle 36 at its upper end so that each end of the shaft 30 can be raised or lowered independently. A suitable winch 38 on the base with a ratchet mechanism, not shown, and handle 38a, plays out a grade line wire 39 which passes through a pulley 40 on the base, then up over a sheave 42 on the transverse shaft, then forward to the front car 10. A removable weight 44 may be carried on the rear car to prevent it from tipping. The sheave 42 may be moved from one side to the other laterally for reasons to be set forth hereinafter and the shaft is provided with a suitable level bubble 46 for reasons explained hereinafter.

The adjustment line is carried to the forward car 10 which may be similar to the rear car. For example, it may have a suitable base 48 on wheels 49 and a frame 50 carrying a transverse shaft 52 with a suitable level bubble 53 and threaded adjustment rods 54 and handles 56 on each side so that the position of the shaft may be changed. The grade line wire 39 is passed over a sheave 58 on the shaft and then connected to a suitable weight 60 or the like so that the grade line wire is kept at a constant tension. Like the rear car, the base and frame of the front car may be of suitable angle iron strips welded together generally as shown. The frame has a suitable scale 62 for reasons set forth later.

The intermediate car, shown in Figures 6 through 8, includes a base 64 or the like on wheels 65 and a frame 66 with suitable sleeves or guides 68. A suitable indicator mechanism 70 is carried in the sleeves so that it may be raised and held in an inoperative position by slidable locks 72 or released to engage the rails. This mechanism may be made up of vertical rods 74 on each side passing through the sleeve 68 and a level or cross beam 76 carrying a level bubble 77 and connected to each of the vertical rods by a threaded adjusting rod 78 having a graduated scale 80. The lower end of each rod is provided with a wheel 82 which is adapted to rest on the rail heads. A suitable member 84 rigidly fastened to the level or cross beam 76 supports an indicator arm 86 pivoted at 88 and biased counterclockwise in Figure 8 by an adjustable counter balance or weight 90. The upper arm of the indicator is formed into a pointer 92 opposite a dial 94 on the cross beam. The cross arm 95 of the indicator at its outer end is formed into a slot or channel 96 opening upwardly between the ends of the two upwardly turned arms, and this upward opening or slot or notch accepts the grade line wire 39. When the locks 72 are withdrawn, as in Figure 7, and the wheels 82 engage the rail head, the indicator mechanism merely floats on the intermediate car which may be a jack, for example. This jack car may have suitable side clamps 98, either power or manually actuated, adapted to come down and grab the rail heads. Power cylinders 100 or the like connected to a suitable power source may be carried by the frame of the car with a shoe 102 at the lower end to engage the road bed and raise the rails. The details of this power mechanism have not been shown as they form no part of the invention.

In normal practice the intermediate car may consist of a track jack. With reference, for example, to Figures 7 and 8, the rail engaging clamps 98 may be engaged with the rails, when it is desired to elevate the rails. In such case the shoe or abutment 102 is aligned between two adjacent ties and is depressed to engage the road bed. The power cylinder units 100 may then be employed to direct a downward thrust of the shoe 102 against the road bed, whereby to lift the rails and with them the ties. Under some circumstances, if the rails are to be lifted upwardly from some particular tie, the shoe 102 may be employed to contact such tie.

Considering now the application of my invention to track alignment, as an example, structure for this purpose is illustrated more or less diagrammatically in Figures 9 and following.

In Figures 9 and 10 the indictaing or aligning assembly includes a plurality of cars, a rear car 110, a front or forward car 112, and one or more intermediate or detector cars 114, all shown as interconnected by spacing units which may take the form of bars 116 or the like suitably connected between adjacent cars and possibly one or more wheeled assemblies 118. The entire assembly is wheeled and is adapted to roll along rails shown at 120 mounted on ties 122.

Taking the cars in order, from rear to front, the rear car may have a base 124 with suitable axles 126 and flanged wheels 128. The base has a suitable frame 130 welded or otherwise secured to it and a suitable platform 132 carries a winch or reel 134 with a longitudinal axis to play out an alignment wire 136 over a suitable pulley 138 on the frame to an outer adjustable sleeve 140. The reel or winch may have a suitable ratchet mechanism 142 or the like. The sheave 140 is carried on a vertically disposed threaded rod 144 which may be manually turned by a handle 146 to raise or lower the sheave. The frame projects to one side of the track, as shown in Figure 14, so that the alignment wire will be spaced a predetermined distance, indicated by Y, from the gauge line, indicated at X, which is perpendicular to the plane at the top of the rails. Whereas, as in Figure 9, I have illustrated a single alignment wire 136 and means supporting it, it will be understood that I may employ wires along each side of a rail, or along each side of the track or along either or each side of each rail. In other words, I may employ a reference wire or line, or more than one of such reference wires or lines, wherever they are usable or desired in relation to a rail or track. It is thought not necessary to duplicate the showing in Figures 9 and 10, but two or more wires can be handled by a duplication of the structure shown at the lower or right side of Figure 9. For two wires this would involve, for example, guide rollers 140, 184 at the opposite side also of the assembly and either a double connection to the winch or reel 134 or a plurality of such winches or reels.

A sub-base 148 projects below the axles and has one or more push rods 150, each rod having a roller 152 adapted to bear against the side of the rail head or flange, with a spring 154, so that all slack or play in the car will be taken out. The push rods force the car to the right in Figure 14 against the flanges on the right side wheels so that the alignment distance Y will always be uniform. In the drawings, two such push rods have been shown extending horizontally, one slightly ahead of and the other slightly behind the car, however, any number could be used. For example, one could be located generally in the center of the car to give a three-point contact, if desired, but two work quite effectively.

I have shown two intermediate or detector or indicator cars, each having a base 156 with axles 158 carrying flanged wheels 160 and a frame 162 rising above and to one side of the base with a detector or feeler mechanism 164. The car also has the side thrust or push rods 166 both ahead of and behind the car so that the car will be thrust laterally against the flanges of the right side wheels. The indicator mechanism includes a suitable scale 168 with a pointer 170 pivoted at 172 having a downwardly open slot 174 below the pivot to receive the alignment wire. It will be understood, of course, that I may employ any desired number of intermediate or detector or indicator cars.

The cars 114 may be of the above described structure, or they may vary, depending upon the operations in connection with which the assembly is to be used. In particular, I may employ recording means to make a recording of existing line. Any suitable recording means may be used to provide a graphic record, the details of which do not of themselves form part of the present invention. Such a record may be employed to indicate what should be done, or to guide work actually being done. It will further be understood that, in addition to variations in the number of intermediate cars or units employed, their position may be widely varied in relation to the end units of the assembly. And the car or cars 114 may be made movable along the wire.

The front or forward car has a base 176 on axles 178 with flanged wheels 180 and a frame 182 extending to one side to receive the alignment wire on a pulley or sheave 184. A pair of inboard pulleys 186 and 188 bring the wire in to an arm 190 pivoted on the frame at 192 with a suitable weight 194 at its outer end, the end of the alignment wire being connected in any one of a suitable number of holes 196, depending upon the tension desired in the wire. It will be further understood that whereas I have illustrated a weight as a tensioning means, coil or leaf springs or any other suitable tensioning means may be employed. The front car may also have lateral thrust or push rods 202 so that the car will be thrust against the flanges of the right side wheels to eliminate play or slack.

Whereas I have shown practical and operative means for carrying out the various steps of my method and have shown practical structures usable for carrying out my method, it will be realized that many changes may be made in sizes, shape, number, and disposition of parts, and in detail and order of steps, without departing from the spirit of my invention. I therefore, wish my description and drawings to be taken as in a broad sense illustrative or diagrammatic rather than as limiting me to my specific disclosure herein.

The use and operation of the invention are as follows:

My invention relates primarily to a method, and also to a mechanism for carrying out the method, in which work is done on an existing track. My method is applicable to correction or change as to level or profile. It is also applicable to correction or change of alignment. It is equally applicable to adjustment or change of track level or profile, and alignment.

Basically my method includes a series of steps in which a datum line is moved forwardly. A datum line is defined between a rear and a forward carriage or station and the rear station is at all times on finished track. The forward station which is always uniformly spaced from the rear station is always located on track or profile to be treated or adjusted. The work is done at an intermediate station which is substantially closer to the rear station than to the forward station for reasons which will later be told in detail.

To take an example of a mechanism usable in the practice of my invention, consider the structure diagrammatically shown in Figures 17 and 18 which includes a rear carriage A and a forward carriage B and a wire tensioned between them. Along the wire, which forms the datum line or plane an intermediate carriage C is located which may include any desired apparatus for adjusting alignment or surface. My method is shown in Figure 17 as applied to correcting track surface and the intermediate carriage C is therefore a structure which raises track, such as a track jack or the like, while in Figure 18 the structure is for alignment and the intermediate carriage C is a track liner.

This group of a minimum of three stations is moved in unison along the track or profile to be improved, with the relative spacing of the stations normally constantly maintained.

Whenever my method is being used to do work I maintain the rear station or carriage always on corrected track or surface or alignment. This may not be the case when I am taking measurements, for example, around a curve. This exception will be considered implicit in the description which follows.

Since the rear station or carriage A is always on corrected track or surface or alignment and since the forward carriage B is on uncorrected surface or alignment the datum line between two carriages shifts in relation to the track or surface between the stations, there being no overall predetermined or final datum line which is general to the whole zone of operation. It should be kept in mind that the corrections are made at the intermediate station C at each progressively advanced location of that station, with the rear car A resting on corrected track and with the front car B on track whose exact relative condition is not definitely known until the steps of correction are carried out in succession to that point. By the time that these steps of correction have been carried out to any such point, the front car will already have gone forward by several steps to track where the conditions are in question and may be somewhat different. In other words, the front car in supporting the position of the forward end of the wire to a predetermined location is always gently leading the datum line to that position. The rear car, being on correct track is stubbornly persistent in making the rear end of the wire come to the correct or relative position of the track that the rear car rests on. What is involved is a compromise which gives uniformity to a very large and practical degree and which reduces error to a uniform and non-damaging minimum.

To take a specific example, if the distance between the front and rear cars is 125 feet and if the intermediate car is 25 feet from the rear car, the ratio of 5:1 is obtained. Under many and perhaps most circumstances in track resurfacing the datum line is actually located farther from the supporting surface at the forward car than at the rear car. For example, with 125 feet wire the forward end of the wire might be 2 inches or more higher than the rear end, in relation to the supporting surface. This is shown diagrammatically in Figure 7. Thus, when the operator at the intermediate station elevates the track to "0" it in relation to the datum line or plane the increase in elevation will be ⅕ of 2 inches. When at any one step of the operation the track has been altered at the intermediate station the entire assembly is then moved forwardly but by a step sufficiently short so that the rear car always rests on track which is in the desired condition or state and which will not be disturbed by work done at the intermediate station. At the next step the forward car will be resting on track which may be somewhat different in elevation from that at which it was resting prior to the step or movement. Normally the adjustment of the wire is not disturbed and numerous following steps may be taken at each of which the rear car rests on correct track and at each of which the front car rests on track to be altered. Thus the datum line as it moves forward step by step does not define a fixed overall or predetermined datum or profile. The operator need not know and never does know what his profile is going to be. An advantage of my method is that the operator is freed of the necessity of conforming to a specific and predetermined datum line. My method of constantly maintaining the rear car on adjusted track and constantly correcting at a point closer to the rear car than the front car irons out or spreads the errors or irregularities and keeps them well within the limit of practical need.

It should be kept in mind that at the intermediate car or station a mechanism is used which senses the datum line and which is effective to indicate the relation of the track to the datum line. As an example I may use a tamper jack to do the work of supporting or elevating the track, with which is associated some pointer or mechanism which may be set to "0" when the desired change has been made. The operator is thus freed from all measurements and computations and need merely watch his indicator and stop the work of elevation or alteration when the indicator pointer is zero.

There are some circumstances where the datum line may be maintained at the same distance above the surface at both stations, in raising track, for example, in taking minor irregularities out of otherwise satisfactory surface. Likewise, under some circumstances it may even be advantageous to have the end of the datum line at the forward station somewhat lower than at the rear station. This is true, for example, when negotiating certain vertical curves.

I have emphasized the importance of doing work nearer the rear station than the front station in order to reduce and spread the error. I have employed in this spacing ratios of 6:1, 5:1, and 3:1 and consider it practical to have ratios as low as 1½:1 in special circumstances. Likewise, I do not wish to be limited to a top range of 6:1 since under some circumstances I wish to considerably exceed that ratio in order to obtain finer adjustments. However, I do consider it important that the intermediate station be nearer or substantially nearer to the rear car than to the front car.

To minimize the error at the working or intermediate car caused by the front or forward car being on incorrect track, the intermediate car is positioned substantially closer to the rear car. Another factor that bears on the location of the intermediate car is the condition or make-up of the track. For example, I position the intermediate car far enough ahead of the rear car or buggy so that the correction applied to the track at the intermediate car will not affect or move the rear car. Thus, the flexibility of the rails and the general condition of the roadbed should be considered. In this case the final position of the intermediate car is determined by a compromise between not moving the rear car when the correction is applied and minimizing error at the point of correction due to the forward car being on incorrect track. The first factor causes the intermediate car to be moved forward away from the rear car and the second causes it to be moved rearward.

Another factor is that the track may tend to bow or whip behind the intermediate car. This is caused by the fact that the track behind the intermediate car, including the section of track that the rear car is on, has already been moved and has, therefore, been freed, so to speak, from the ballast. But the track ahead of the intermediate car is in its original location. It may have become tightly stuck or well embedded over a period of time and, therefore, will resist movement to one side or the other or raising. In this case when a vertical or horizontal thrust is applied to the track at the intermediate car, the track forward of the intermediate car will tend to stick or will move less, but the track behind it, since it has already been freed, will offer less resistance and will move. The spacing between the intermediate and rear cars should take this "bowing" tendency into consideration.

A compromise or balance between these factors is dependent upon the amount of correction that will normally be required in any given section or location of track. This may vary from one locale to another and the intermediate car might be moved forward or back in the assembly, depending upon the condition of the roadbed.

In relation to the above discussed avoidance of computations, it should also be kept in mind that the nearer the intermediate station is to the rear station, the less is the actual error as the change made at the intermediate station, in a 6:1 spacing ratio, will be only ⅙ of the indicated excess in height of the front end of the datum line from its supporting surface. Thus the operators at the intermediate station make a relatively small change in elevation or alignment and are completely protected from any substantial divergence from a desired profile if the front station is, for example, in an unexpectedly low spot or on an unexpectedly high spot. The excesses caused by any such unpredictable variation in surface on which the forward car is supported are thus ironed out and spread out over a substantial length of track and have no harmful effect. Thus an error of one inch at the front car could not mean more than an error of ⅕ inch at the intermediate car where the work is done and at the next step this error would be reduced to ⅕ of ⅕ or ¹⁄₂₅ of an inch, and so on, as later locations are reached. Thus the placement of the intermediate station minimizes in effect all existing irregularities encountered by the front station.

The above discussion has been in relation to the surface or profile of track or the like. The same factors, however, apply precisely to alignment of existing track and the like.

The avoidance of the necessity of sighting along the rail makes it practical to use my method in night operation which has, in the past, not been practical.

I claim:

1. A method of doing work on an existing track to adjust it to a reference line which includes the steps of establishing a positive reference line along the track between movable forward and rear stations which are spaced apart a substantial distance, establishing an intermediate station between the forward and rear stations, spacing the intermediate station sufficiently nearer the rear station than the forward station but sufficiently forward of the rear station relative to the characteristics of the track so that when work is done at the intermediate station the track will not be affected at the rear station and the position of the rear station and the relation of the reference line to the track at the rear station will remain unaffected, doing work at the intermediate station to change the relation of the track to the reference line, terminating the work when the track at the intermediate station has been brought to an adjusted predetermined relation to the reference line, moving the rear, intermediate and forward stations forward in a sequence of steps, each of which is no longer than the distance between the intermediate and rear stations so that the rear station will be on adjusted track at all times, successively doing work to the track to adjust it, between steps, at the intermediate station to bring the track at the intermediate station to an adjusted predetermined relation to the reference line, and maintaining the relative spacing between the rear, intermediate and forward stations while work is being done.

2. The method of claim 1 further characterized by and including the step of maintaining the reference line at a higher level above the track at the forward station than at the rear station.

3. The method of claim 1 further characterized in that the step of doing work at the intermediate station includes raising the track to bring the level of the track to an adjusted predetermined relation to the reference line, and further characterized in that the step of establishing a positive reference line along the track between forward and rear stations includes tensioning an otherwise free wire between the forward and rear stations.

4. The method of claim 1 further characterized in that the step of doing work at the intermediate station includes shifting the track laterally to correct existing misalignment.

5. The method of claim 1 further characterized by and including the step of maintaining the relative spacing between the rear, intermediate and forward stations at all times.

6. The method of claim 1 further characterized in that the step of doing work at the intermediate station includes shifting the track laterally to correct existing misalignment, and further characterized in that the step of establishing a positive reference line along the track between forward and rear stations includes tensioning an otherwise free wire between the forward and rear stations.

7. The method of claim 1 further characterized in that the step of doing work at the intermediate station includes raising the track to bring the level of the track to an adjusted predetermined relation to the reference line.

8. An assembly for doing work on an existing track including front and rear cars separated a substantial distance, means on the front and rear cars for establishing a positive reference line along the track, an intermediate car in the assembly substantially nearer the rear car than the front car but sufficiently forward of the rear car relative to the characteristics of the track so that when work is done at the intermediate car the track will not be affected at the rear car and the position of the rear car and the relation of the reference line to the track will remain unaffected, a series of spacers which maintain the cars in their relative spacing during movement of the entire assembly, means at the intermediate car for doing work to the track to change the relation of the track to the reference line, and sensing means at the intermediate car for sensing the relation of the track relative to the reference line at the intermediate car.

9. The structure of claim 8 further characterized in that the means for establishing a positive reference line between the front and rear cars includes at least one tensioned wire otherwise freely suspended between the front and rear cars.

References Cited in the file of this patent

UNITED STATES PATENTS

| | | |
|---|---|---|
| 785,252 | Cravens | Mar. 21, 1905 |
| 2,412,463 | McDaniel | Dec. 10, 1946 |
| 2,693,769 | Herlehy | Nov. 9, 1954 |
| 2,725,016 | Fogelberg et al. | Nov. 29, 1955 |
| 2,734,463 | Hursh et al. | Feb. 14, 1956 |
| 2,861,521 | Vito et al. | Nov. 25, 1958 |

FOREIGN PATENTS

| | | |
|---|---|---|
| 753,519 | Great Britain | July 25, 1956 |